United States Patent
Luo et al.

(10) Patent No.: US 12,188,764 B2
(45) Date of Patent: Jan. 7, 2025

(54) THREE-DIMENSIONAL TARGET, WHEEL POSITIONING SYSTEM, AND WHEEL POSITIONING METHOD

(71) Applicant: Autel Intelligent Technology Corp., Ltd., Shenzhen (CN)

(72) Inventors: Wenhui Luo, Shenzhen (CN); Lianjun Liu, Shenzhen (CN)

(73) Assignee: Autel Intelligent Technology Corp., Ltd., Shenzhen (CN)

( * ) Notice: Subject to any disclaimer, the term of this patent is extended or adjusted under 35 U.S.C. 154(b) by 172 days.

(21) Appl. No.: 17/934,577

(22) Filed: Sep. 23, 2022

(65) Prior Publication Data

US 2023/0013238 A1 Jan. 19, 2023

Related U.S. Application Data

(63) Continuation of application No. PCT/CN2021/081055, filed on Mar. 16, 2021.

(30) Foreign Application Priority Data

Apr. 1, 2020 (CN) .......................... 202010251339.4

(51) Int. Cl.
 *G01B 11/275* (2006.01)
 *G06T 7/70* (2017.01)
(52) U.S. Cl.
 CPC ............ *G01B 11/2755* (2013.01); *G06T 7/70* (2017.01)
(58) Field of Classification Search
 CPC .......... G01B 11/2755; G01B 2210/143; G01B 2210/30; G01B 11/275; G06T 7/70
 See application file for complete search history.

(56) References Cited

U.S. PATENT DOCUMENTS 5,535,522 A * 7/1996 Jackson ............. G01B 11/2755
  33/203.18
5,724,743 A * 3/1998 Jackson ............. G01B 11/2755
  33/203.18
(Continued)

FOREIGN PATENT DOCUMENTS

CN 104019751 A 9/2014
CN 105373792 A 3/2016
(Continued)

OTHER PUBLICATIONS

International Search Report of PCT Patent Application No. PCT/CN2021/081055 issued on Jun. 16, 2021.
(Continued)

*Primary Examiner* — John R Schnurr
(74) *Attorney, Agent, or Firm* — Andrew C. Cheng (57) ABSTRACT

A three-dimensional target, a wheel positioning system, and a wheel positioning method are provided. The three-dimensional target includes a base body. The base body is provided with at least three target surfaces which are all in different planes. Each of the at least three target surfaces is provided with target elements. Each of the at least three target surfaces is used for wheel positioning. Two of the at least three target surfaces form a group of calculation units, and the spatial position relationship between the target elements of at least two groups of calculation units is used for determining the position of a wheel. By using two target surfaces as a group, the at least three target surfaces can be configured into multiple groups, and calibration is performed according to the multiple target surfaces; thus, the accuracy of calibration calculation is improved.

19 Claims, 3 Drawing Sheets

(56) References Cited

U.S. PATENT DOCUMENTS

| | | | | |
|---|---|---|---|---|
| 6,134,792 | A * | 10/2000 | January | G01B 11/2755 356/139.09 |
| 6,323,776 | B1 * | 11/2001 | Jackson | G05B 19/401 382/172 |
| 6,839,972 | B2 * | 1/2005 | Jackson | G01B 11/002 348/E13.016 |
| 6,894,771 | B1 * | 5/2005 | Dorrance | G01B 11/2755 356/139.09 |
| 7,444,752 | B2 | 11/2008 | Stieff et al. | |
| 7,703,212 | B2 | 4/2010 | Stieff et al. | |
| 7,930,834 | B2 | 4/2011 | Stieff et al. | |
| 8,033,028 | B2 | 10/2011 | Stieff et al. | |
| 8,215,023 | B2 | 7/2012 | Stieff et al. | |
| 8,341,848 | B2 | 1/2013 | Stieff et al. | |
| 8,490,290 | B2 | 7/2013 | Stieff et al. | |
| 8,561,307 | B2 | 10/2013 | Stieff et al. | |
| 8,875,407 | B2 | 11/2014 | Stieff et al. | |
| 9,300,864 | B2 * | 3/2016 | Cerruti | G01B 11/2755 |
| 9,544,545 | B2 | 1/2017 | Stieff et al. | |
| 2002/0092183 | A1 * | 7/2002 | Jackson | G01B 5/255 33/203.18 |
| 2004/0170315 | A1 | 9/2004 | Kosaka | |
| 2004/0202364 | A1 | 10/2004 | Otani | |
| 2007/0068016 | A1 | 3/2007 | Stieff et al. | |
| 2008/0271328 | A1 | 11/2008 | Stieff et al. | |
| 2008/0289202 | A1 * | 11/2008 | Kassouf | G01B 11/2755 33/203.18 |
| 2010/0165332 | A1 | 7/2010 | Stieff et al. | |
| 2011/0001821 | A1 | 1/2011 | Stieff et al. | |
| 2011/0170089 | A1 | 7/2011 | Stieff et al. | |
| 2011/0316979 | A1 | 12/2011 | Stieff et al. | |
| 2012/0170811 | A1 | 7/2012 | Kassouf | |
| 2012/0236146 | A1 | 9/2012 | Stieff et al. | |
| 2013/0176428 | A1 | 7/2013 | Stieff et al. | |
| 2013/0250098 | A1 * | 9/2013 | Stieff | G01B 11/2755 348/135 |
| 2014/0354818 | A1 | 12/2014 | Stieff et al. | |
| 2017/0030711 | A1 * | 2/2017 | Duff | G01B 11/2755 |
| 2018/0053320 | A1 * | 2/2018 | Kunert | G06T 7/60 |
| 2019/0331482 | A1 * | 10/2019 | Lawrence | G07C 5/08 |
| 2020/0088515 | A1 * | 3/2020 | Rogers | H04N 23/54 |
| 2023/0199332 | A1 * | 6/2023 | Luo | H04N 23/51 |

FOREIGN PATENT DOCUMENTS

| | | |
|---|---|---|
| CN | 103080694 B | 4/2016 |
| CN | 105841639 A | 8/2016 |
| CN | 111307074 A | 6/2020 |
| CN | 111879261 A | 11/2020 |
| CN | 211855241 U | 11/2020 |
| CN | 212692809 U | 3/2021 |
| EP | 2612107 B1 | 7/2018 |
| EP | 3364149 A1 | 8/2018 |
| WO | 2012030412 A1 | 3/2012 |

OTHER PUBLICATIONS

Search Report of EP Patent Application No. 21779288.6 issued on Jul. 7, 2023.

\* cited by examiner

THREE-DIMENSIONAL TARGET, WHEEL POSITIONING SYSTEM, AND WHEEL POSITIONING METHOD

CROSS REFERENCE TO RELATED APPLICATION

The present application is a continuation application of international Application No. PCT/CN2021/081055, filed on Mar. 16, 2021, which claims priority to the Chinese Patent Application No. 202010251339.4, filed to the Chinese patent office on Apr. 1, 2020, the entire contents of which are incorporated herein by reference.

TECHNICAL FIELD

The present application relates to the technical field of calibration, in particular to a three-dimensional target, a wheel positioning system, and a wheel positioning method.

BACKGROUND

At present, a wheel positioning system has been widely applied to the technical field of automobile calibration. For example, the wheel positioning system may acquire a three-dimensional target assembled on a vehicle and perform calculation according to the position of the three-dimensional target, thereby achieving vehicle calibration. However, the technical problems that measurement calculation is few in dimension and calibration calculation is lower in precision are caused in the three-dimensional target adopting single target surface.

SUMMARY

Purposes of embodiments of the present application are to provide a three-dimensional target, a wheel positioning system, a wheel positioning method, by which the technical problem that the calibration calculation is lower in precision in the prior art may be solved.

The embodiments of the present application adopt the following technical solutions:

an embodiment of the present application provides a three-dimensional target used for wheel positioning, wherein the three-dimensional target includes a base body; the base body is provided with at least three target surfaces, and the at least three target surfaces are all in different planes:

each of the at least three target surfaces is provided with target elements, the target elements in each of the at least three target surfaces having a predetermined spatial positional relationship and predetermined geometric properties:

each of the at least three target surfaces is used for wheel positioning;

wherein two of the at least three target surfaces form a group of calculation units, and the spatial position relationship between the target elements of at least two groups of calculation units is used for determining the position of a wheel.

Optionally, the base body is of a stereoscopic blocky structure provided with multiple outer surfaces, wherein the outer surfaces of the base body are provided with the at least three target surfaces.

Optionally, the target surfaces are flat surfaces or curved surfaces.

Optionally, the at least three target surfaces are disposed with a preset angle formed between every two of the at least three target surfaces.

Optionally, the target elements are geometric patterns concavely or convexly disposed on the target surfaces.

Optionally, one end surface of the base body is provided with a first target surface, the other end surface of the base body is provided with a second target surface, the base body extends outwards to form a convex part, and the convex part is provided with a third target surface, wherein the first target surface and the third target surface are disposed in parallel, and the second target surface is located between the first target surface and the third target surface.

Optionally, the first target surface and the third target surface face the same horizontal direction, and the first target surface and the second target surface are disposed at a preset angle.

Optionally, a mounting cavity is concavely disposed towards the inside of the base body from the second target surface, and a fixing hole is disposed in the bottom of the mounting cavity, the fixing hole passing through the bottom of the mounting cavity.

Optionally, the base body has a step-shaped configuration, the base body includes a first step, a second step, and a third step, an end surface of the first step is provided with a first target surface, an end surface of the second step is provided with a second target surface, and an end surface of the third step is provided with a third target surface.

Optionally, the base body includes a first wall section, a second wall section, and a third wall section, every two of the first wall section, the second wall section and the third wall section are perpendicular to each other to co-define a conical space, the side, facing the conical space, of the first wall section is provided with a first target surface, the side, facing the conical space, of the second wall section is provided with a second target surface, and the side, facing the conical space, of the second wall section is provided with a third target surface.

An embodiment of the present application provides a wheel positioning system, including a three-dimensional target, an image acquisition device, and a processing system;

the three-dimensional target is attached to a wheel, the vision range of the image acquisition device faces the three-dimensional target, and the image acquisition device is electrically connected to the processing system;

wherein the three-dimensional target includes a base body; the base body is provided with at least three target surfaces, and the at least three target surfaces are all in different planes; each of the at least three target surfaces is provided with target elements, the target elements in each of the at least three target surfaces having a predetermined spatial positional relationship and predetermined geometric properties; the at least three target surfaces face the image acquisition device;

the image acquisition device is configured to acquire images of the target elements of two of the target surfaces in the at least three target surfaces, wherein two of the target surfaces form a group of calculation units; and the processing system is configured to calculate at least two pieces of wheel positioning information according to the images of the target elements of at least two groups of calculation units, compare whether the at least two pieces of wheel positioning information are consistent, and determine the position of the wheel according to the wheel positioning information if the at least two pieces of wheel positioning information are consistent.

Optionally, the image acquisition device is further configured to acquire an image of each of the target surfaces in the at least three target surfaces; and the processing system is further configured to screen images of at least two of the target surfaces and determine the position of the wheel according to the images of the at least two of the target surfaces.

Optionally, the base body is of a stereoscopic blocky structure provided with multiple outer surfaces, wherein the outer surfaces of the base body are provided with the at least three target surfaces.

Optionally, the target surfaces are flat surfaces or curved surfaces.

Optionally, the at least three target surfaces are disposed with a preset angle formed between every two of the at least three target surfaces.

Optionally, the target elements are geometric patterns concavely or convexly disposed on the target surfaces.

Optionally, one end surface of the base body is provided with a first target surface, the other end surface of the base body is provided with a second target surface, the base body extends outwards to form a convex part, and the convex part is provided with a third target surface, wherein the first target surface and the third target surface are disposed in parallel, and the second target surface is located between the first target surface and the third target surface.

Optionally, the first target surface and the third target surface face the same horizontal direction, and the first target surface and the second target surface are disposed at a preset angle.

Optionally, a mounting cavity is concavely disposed towards the inside of the base body from the second target surface, and a fixing hole which is through is disposed in the bottom of the mounting cavity.

Optionally, the base body has a step-shaped configuration, the base body includes a first step, a second step, and a third step, an end surface of the first step is provided with a first target surface, an end surface of the second step is provided with a second target surface, and an end surface of the third step is provided with a third target surface.

Optionally, the base body includes a first wall section, a second wall section, and a third wall section, every two of the first wall section, the second wall section and the third wall section are perpendicular to each other to co-define a conical space, the side, facing the conical space, of the first wall section is provided with a first target surface, the side, facing the conical space, of the second wall section is provided with a second target surface, and the side, facing the conical space, of the second wall section is provided with a third target surface.

An embodiment of the present application provides a wheel positioning method, wherein the method includes:

attaching a three-dimensional target to a wheel, wherein the three-dimensional target includes a base body; the base body is provided with at least three target surfaces, and the at least three target surfaces are all in different planes; and each of the at least three target surfaces is provided with target elements, the target elements in each of the at least three target surfaces having a predetermined spatial positional relationship and predetermined geometric properties:

acquiring images of the target elements of two of the target surfaces in the at least three target surfaces, wherein two of the target surfaces form a group of calculation units; and calculating at least two pieces of wheel positioning information according to the images of the target elements of at least two groups of calculation units, comparing whether the at least two pieces of wheel positioning information are consistent, and determining the position of the wheel according to the wheel positioning information if the at least two pieces of wheel positioning information are consistent.

Optionally, acquiring images of the target elements of two of the target surfaces in the at least three target surfaces comprises:

an image acquisition device acquiring images of the target elements of the at least three target surfaces; and screening out images of the target elements of at least two of the at least three target surfaces from the images acquired by the image acquisition device.

Optionally, the base body is of a stereoscopic blocky structure provided with multiple outer surfaces, wherein the outer surfaces of the base body are provided with the at least three target surfaces.

Optionally, the target surfaces are flat surfaces or curved surfaces.

Optionally, the at least three target surfaces are disposed with a preset angle formed between every two of the at least three target surfaces.

Optionally, the target elements are geometric patterns concavely or convexly disposed on the target surfaces.

Optionally, one end surface of the base body is provided with a first target surface, the other end surface of the base body is provided with a second target surface, the base body extends outwards to form a convex part, and the convex part is provided with a third target surface, wherein the first target surface and the third target surface are disposed in parallel, and the second target surface is located between the first target surface and the third target surface.

Optionally, the first target surface and the third target surface face the same horizontal direction, and the first target surface and the second target surface are disposed at a preset angle.

Optionally, a mounting cavity is concavely disposed towards the inside of the base body from the second target surface, and a fixing hole which is through is disposed in the bottom of the mounting cavity.

Optionally, the base body has a step-shaped configuration, the base body includes a first step, a second step, and a third step, an end surface of the first step is provided with a first target surface, an end surface of the second step is provided with a second target surface, and an end surface of the third step is provided with a third target surface.

Optionally, the base body includes a first wall section, a second wall section, and a third wall section, every two of the first wall section, the second wall section and the third wall section are perpendicular to each other to co-define a conical space, the side, facing the conical space, of the first wall section is provided with a first target surface, the side, facing the conical space, of the second wall section is provided with a second target surface, and the side, facing the conical space, of the second wall section is provided with a third target surface.

Compared with the prior art, in the three-dimensional target in the present embodiments, the base body is provided with at least three target surfaces, the at least three target surfaces are all in different planes, and the target surfaces are provided with the target elements for calibration. Therefore, by using two target surfaces as a group, the at least three target surfaces can be configured into multiple groups, and calibration is performed according to the multiple groups of target surfaces, thus, the accuracy of calibration calculation can be improved. In addition, by comparing calibration parameters obtained by each group of target surfaces, it may be determined whether the three-dimensional target meets a demand on precise calibration, and thus, the invalid three-dimensional target may be replaced in time.

BRIEF DESCRIPTION OF THE DRAWINGS

One or more embodiments are exemplarily described with figures in accompanying drawings corresponding to the embodiments, these exemplary descriptions do not constitute limitations on the embodiments, elements with the same reference numerals in the accompanying drawings denote similar elements, unless otherwise specified, the figures in the accompanying drawings are not limited in proportion.

DETAILED DESCRIPTION

In order to facilitate understanding the present application, the present application will be described in more detail below with reference to the accompanying drawings and specific embodiments. It needs to be noted that when one element is stated as "fixed to" another element, the element may be directly located on another element, or one or more centered elements may exist therebetween. When one element is stated as "connected to" another element, the element may be directly connected to another element, or one or more centered elements may exist therebetween. Directional or positional relationships indicated by terms such as "upper", "lower", "inner", "outer", "vertical", and "horizontal" used in the present application are directional or positional relationships based on the accompanying drawings, are merely intended to facilitate describing the present application and simplifying the description, rather than to indicate or imply that the appointed device or element has to be located in a specific direction or structured and operated in the specific direction so as not to be understood as restrictions on the present application.

Unless defined otherwise, all technical and scientific terms used the present description have the same meaning as commonly understood by those of ordinary skill in the art to which this technology belongs. The terms used in the description of the present application are merely for the purpose of describing specific embodiments, rather than to limit the present application. The term "and/or" used in the present description includes any or all of combinations of one or more listed relevant items.

In addition, the technical features related to the different embodiments, described as below, of the present application may be combined with one another as long as they are not conflictive.

Figure 1:
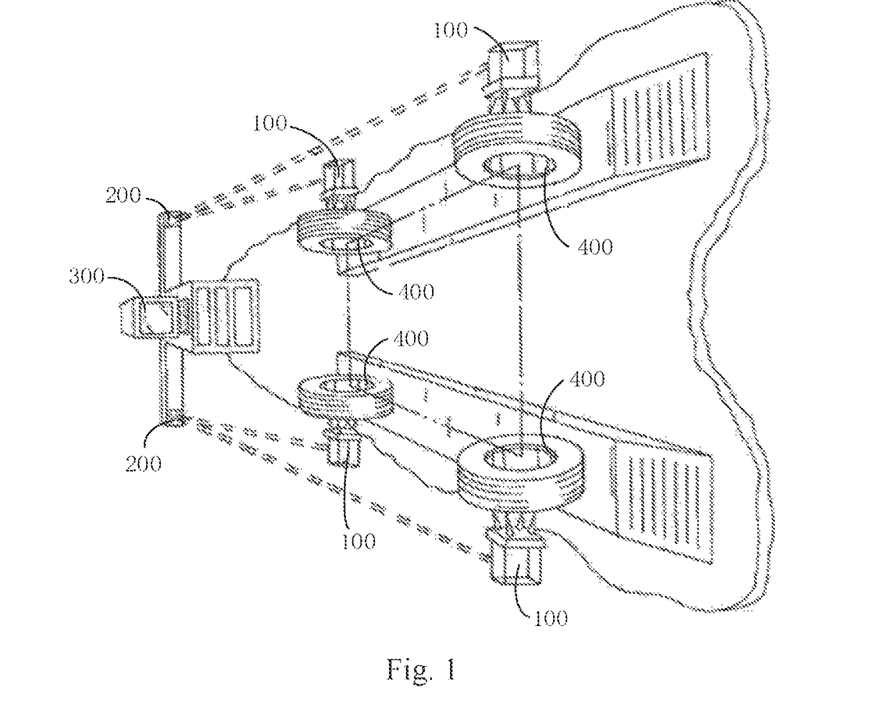
FIG. 1 is a schematic view of an application scenario of a three-dimensional target provided in one embodiment of the present application.

With reference to FIGS. 1 to 6, an embodiment of the present application provides a three-dimensional target 100 with multiple surfaces. The three-dimensional target 100 may be applied to a wheel positioning system. For example, as shown in FIG. 1, the wheel positioning system includes the three-dimensional target 100, an image acquisition device 200 and a processing system 300. The three-dimensional target 100 is attached to a wheel 400, the vision range of the image acquisition device 200 faces the three-dimensional target 100, and the image acquisition device 200 is electrically connected to the processing system 300. The image acquisition device 200 acquires an image of the three-dimensional target 100 and feeds the image back to the processing system 300, and the processing system 300 determines the position of the wheel 400 according to the image of the three-dimensional target 100.

First Embodiment

Figure 2:
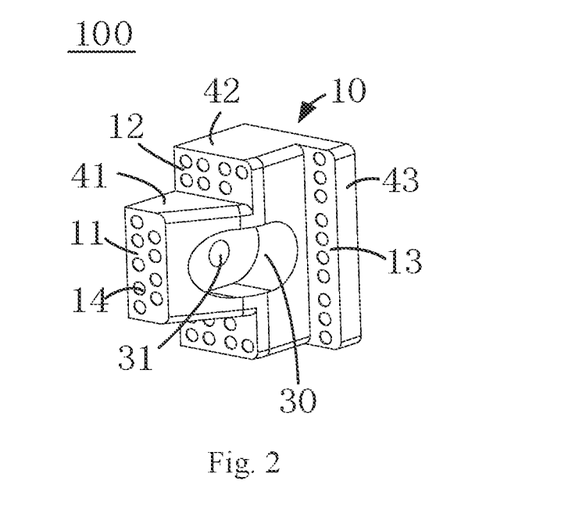
FIG. 2 is a schematic view of a three-dimensional target provided in one embodiment of the present application.

As shown in FIG. 2, the three-dimensional target 100 includes a base body 10. The base body 10 is shaped like a stereoscopic block provided with multiple outer surfaces, and optionally, the base body 10 is of a regular geometrical shape. The base body 10 is provided with at least three target surfaces, and the at least three target surfaces are all in different planes, wherein the outer surfaces of the base body 10 are provided with at least three target surfaces, and the at least three target surfaces are all in different planes. Each of the at least three target surfaces is provided with target elements 14, the spatial positional relationship between the target elements 14 is known, and the geometric properties of the target elements 14 are known. That is, the target elements 14 in each of the at least three target surfaces have a predetermined spatial positional relationship and predetermined geometric properties. For example, the target surfaces are disposed with a preset angle formed between every two of them, and the target surfaces are provided with the target elements 14 configured to be subjected to image acquisition, wherein the target elements 14 are geometric patterns which are concavely or convexly disposed. In the present embodiment, the target elements 14 are round spots concavely disposed in the target surfaces.

In the present embodiment, the target surfaces on the three-dimensional target 100 are protruded outwards, image data may be easily acquired by the image acquisition device 200 from the target elements 14 located on the target surfaces, the at least three target surfaces may respectively face multiple directions, and the at least three target surfaces are all in different planes, so that the three-dimensional target 100 may adapt to multiple outer viewing angles, the image acquisition device 200 may conveniently acquire the image data, and the three-dimensional target 100 is wider in application range. For example, when the three-dimensional target 100 is fixed to a calibrated object, the situation that some of the target surfaces are shielded may occur, but some of the target surfaces may also be protruded so that the image data is easily acquired. By reasonable design, even if individual target surfaces are shielded, the target elements 14 on the remaining visible target surfaces may still be acquired and calculated. The target elements 14 of the multiple target surfaces are acquired and calculated, and thus, the positioning precision is improved.

In addition, two of the target surfaces are used as a group, so that the at least three target surfaces can be configured into multiple groups. Numerical values calculated according to the different groups of target surfaces are compared and calculated, if wheel position information calculated according to each group of target surfaces is consistent or smaller than a preset error range, factory settings are met, and measurement inaccuracy caused by structural variation, such as aging deformation or collision deformation, of the three-dimensional target 100 does not occur. Based on this, if the numerical values calculated according to all the groups of target surfaces are inconsistent or differ greatly, the factory settings are not met, and the three-dimensional target 100 needs to be replaced or returned to a factory so as to be calibrated.

Specifically, in the present embodiment, the base body 10 has a step-shaped configuration, the base body 10 includes a first step 41, a second step 42, and a third step 43 which are integrally connected in sequence, an end surface of the first step 41 is provided with a first target surface 11, an end surface of the second step 42 is provided with a second target surface 12, and an end surface of the third step 43 is provided with a third target surface 13, wherein the first target surface 11, the second target surface 12 and the third target surface 13 are disposed in parallel, and the first target surface 11, the second target surface 12 and the third target surface 13 face the same horizontal direction.

Further, the base body 10 is concavely provided with a mounting cavity 30, and a fixing hole 31 which is through is disposed in the bottom of the mounting cavity 30. By the fixing hole 31, the base body 10 may be fixed to a calibrated object (such as a wheel 400 of a calibrated vehicle). Optionally, the mounting cavity 30 is concavely disposed towards the inside of the base body 10 from the side of the base body 10, wherein an extension direction of the mounting cavity 30 is perpendicular to a direction that the first target surface 11 faces.

In the present embodiment, the base body 10 is concavely provided with the mounting cavity 30, so that the three-dimensional target 100 is flexibly and conveniently mounted on the calibrated object, and meanwhile, the phenomenon that the target surfaces located on the base body 10 are shielded by the calibrated object or a fixing piece can be avoided as much as possible.

Figure 3:
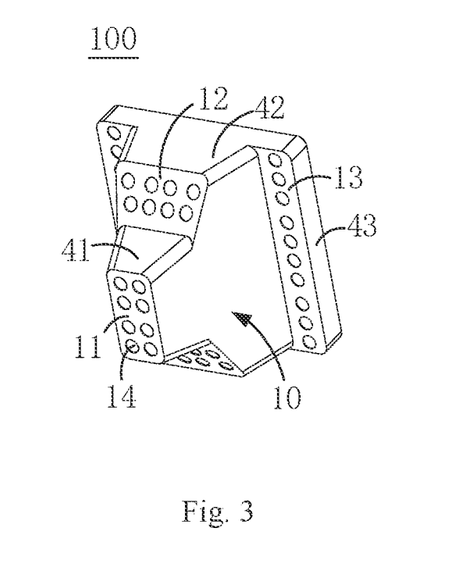
FIG. 3 is a schematic view of a three-dimensional target provided in another embodiment of the present application.
Figure 4:
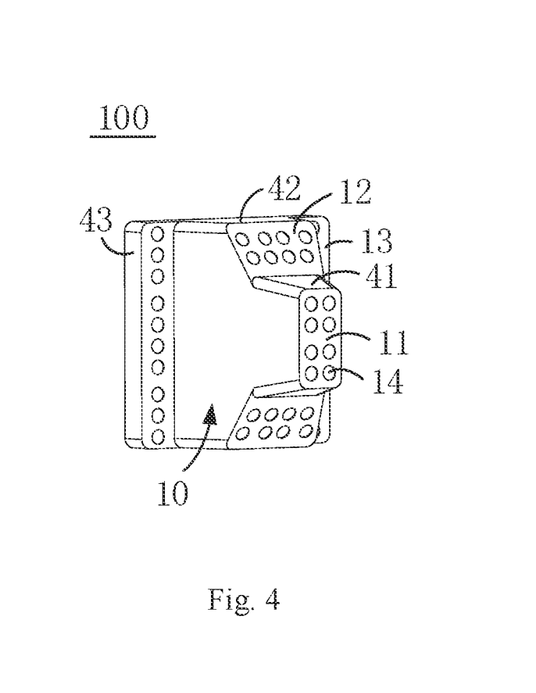
FIG. 4 is a view seen from another viewing angle as shown in FIG. 3.

As shown in FIG. 3 and FIG. 4, in some other embodiments, the first target surface 11 and the second target surface 12 are disposed to be unparallel.

A wheel positioning system is provided based on the three-dimensional target 100 as shown in FIGS. 2 to 4 with reference to an application scenario as shown in FIG. 1, and the wheel positioning system includes the three-dimensional target 100, the image acquisition device 200 and the processing system 300.

The three-dimensional target 100 is attached to a wheel 400, the vision range of the image acquisition device 200 faces the three-dimensional target 100, and the image acquisition device 200 is electrically connected to the processing system 300.

The at least three target surfaces face the image acquisition device 200, and the image acquisition device 200 is configured to acquire an image of each of the target surfaces in the at least three target surfaces.

The processing system 300 is configured to screen out images of at least two of the target surfaces and determine the position of the wheel 400 according to the images of the at least two of the target surfaces.

In some other embodiments, two of the target surfaces are a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

For example, as shown in FIG. 3, the image acquisition device 200 acquires the image of the three-dimensional target 100 and feeds the image back to the processing system 300, and the processing system 300 recognizes and screens out the first target surface 11, the second target surface 12 and the third target surface 13. The first target surface 11 and the second target surface 12 are used as a first group, the first target surface 11 and the third target surface 13 are used as a second group, if wheel positioning information calculated according to the target surfaces in the first group and wheel positioning information calculated according to the target surfaces in the second group are consistent or smaller than a preset error range, it is proven that the three-dimensional target 100 conforms to the factory settings, and the phenomenon of measure inaccuracy caused by structural variation does not occur in the three-dimensional target 100.

As shown in FIG. 4, if some target surfaces are shielded, for example, the third target surface 13 is partially shielded, the target elements 14 located on the third target surface 13 may not be recognized by the processing system 300, and therefore, the processing system 300 may only recognize and acquire image data of the first target surface 11 and the second target surface 12. When the three-dimensional target 100 is fixed to the calibrated object, the situation that some of the target surfaces are shielded may occur, but some of the target surfaces may also be protruded so that the image data is easily acquired. By reasonable design, even if individual target surfaces are shielded, the target elements 14 on the remaining visible target surfaces may still be acquired and calculated. The target elements 14 of the multiple target surfaces are acquired and calculated, and thus, the positioning precision is improved.

A wheel positioning method is provided based on the above-mentioned wheel positioning system. Specifically, the three-dimensional target 100 is attached to the outer surface of the wheel 400. The image acquisition device 200 acquires images of the target elements 14 of two of the target surfaces in the at least three target surfaces, and the processing system 300 is configured to screen out images of at least two of the target surfaces and determine the position of the wheel 400 according to the images of the at least two of the target surfaces.

In some other embodiments, two of the target surfaces form a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

For example, the processing system 300 recognizes and screens out the images of the target elements 14 of two of the target surfaces from the images fed back by the image acquisition device 200, and then, the position of the wheel 400 may be determined according to the images of the target elements 14 of the target surfaces. Further, before the position of the wheel 400 is determined, two of the target surfaces are a group of calculation units, numerical values calculated according to the different groups of target surfaces are compared and calculated, if wheel position information calculated according to each group of target surfaces is consistent or smaller than a preset error range, factory settings are met, and the position of the wheel 400 may be determined based on the images of the target elements 14 of the target surfaces. Optionally, the position of the wheel 400 is determined according to an average value of the wheel positioning information calculated by the multiple groups of calculation units.

Second Embodiment

Figure 5:
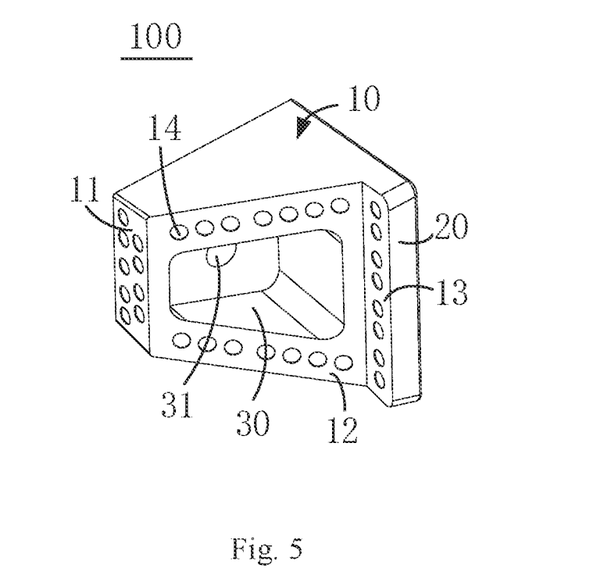
FIG. 5 is a schematic view of a three-dimensional target provided in further embodiment of the present application.

As shown in FIG. 5, the three-dimensional target 100 includes a base body 10. The base body 10 is shaped like a stereoscopic block provided with multiple outer surfaces, and optionally, the base body 10 is of a regular geometrical shape. The base body 10 is provided with at least three target surfaces, and the at least three target surfaces are all in different planes, wherein the outer surfaces of the base body 10 are provided with at least three target surfaces, and the at least three target surfaces are all in different planes. The at least three target surfaces are each provided with target elements 14, the spatial positional relationship between the target elements 14 is known, and the geometric properties of the target elements 14 are known, for example, the target surfaces are disposed at a preset angle, and the target surfaces are provided with the target elements 14 configured to be subjected to image acquisition, wherein the target elements 14 are geometric patterns which are concavely or convexly disposed. In the present embodiment, the target elements 14 are round spots concavely disposed in the target surfaces.

In the present embodiment, the target surfaces on the three-dimensional target 100 are protruded outwards, image data may be easily acquired by the image acquisition device 200 from the target elements 14 located on the target surfaces, the at least three target surfaces may respectively face multiple directions, and the at least three target surfaces are all in different planes, so that the three-dimensional target 100 may adapt to multiple outer viewing angles, the image acquisition device 200 may conveniently acquire the image data, and the three-dimensional target 100 is wider in application range. For example, when the three-dimensional target 100 is fixed to a calibrated object, the situation that some of the target surfaces are shielded may occur, but some of the target surfaces may also be protruded so that the image data is easily acquired. By reasonable design, even if individual target surfaces are shielded, the target elements 14 on the remaining visible target surfaces may still be acquired and calculated. The target elements 14 of the multiple target surfaces are acquired and calculated, and thus, the positioning precision is improved.

In addition, two of the target surfaces are used as a group, so that the at least three target surfaces can be configured into multiple groups. Numerical values calculated according to the different groups of target surfaces are compared and calculated, if wheel position information calculated according to each group of target surfaces is consistent or smaller than a preset error range, factory settings are met, and measurement inaccuracy caused by structural variation, such as aging deformation or collision deformation, of the three-dimensional target 100 does not occur. Based on this, if the numerical values calculated according to all the groups of target surfaces are inconsistent or differ greatly, the factory settings are not met, and the three-dimensional target 100 needs to be replaced or returned to a factory so as to be calibrated.

Specifically, in the present embodiment, the cross section of the base body 10 is trapezoidal, an end surface of the base body 10 is provided with a first target surface 11, the other end surface of the base body 10 is provided with a second target surface 12, the base body 10 extends outwards to form a convex part 20, and the convex part 20 is provided with a third target surface 13, wherein the first target surface 11 and the third target surface 13 are disposed in parallel, and the first target surface 11 and the third target surface 13 face the same horizontal direction. The second target surface 12 is located between the first target 11 and the third target surface 13, and the first target surface and the second target surface 12 are disposed at a preset angle.

Further, the base body 10 is concavely provided with a mounting cavity 30, and a fixing hole 31 which is through is disposed in the bottom of the mounting cavity 30. By the fixing hole 31, the base body 10 may be fixed to a calibrated object (such as a wheel 400 of a calibrated vehicle). Optionally, the mounting cavity 30 is concavely disposed towards the inside of the base body 10 from the side of the base body 10, wherein the target elements 14 located on the second target surface 12 are disposed around the mounting cavity 30.

In the present embodiment, the base body 10 is concavely provided with the mounting cavity 30, so that the three-dimensional target 100 is flexibly and conveniently mounted on the calibrated object, and meanwhile, the phenomenon that the target surfaces located on the base body 10 are shielded by the calibrated object or a fixing piece can be avoided as much as possible.

A wheel positioning system is provided based on the three-dimensional target 100 as shown in FIG. 5 with reference to an application scenario as shown in FIG. 1, and the wheel positioning system includes the three-dimensional target 100, the image acquisition device 200 and the processing system 300.

The three-dimensional target 100 is attached to a wheel 400, the vision range of the image acquisition device 200 faces the three-dimensional target 100, and the image acquisition device 200 is electrically connected to the processing system 300.

The at least three target surfaces face the image acquisition device 200, and the image acquisition device 200 is configured to acquire an image of each of the target surfaces in the at least three target surfaces.

The processing system 300 is configured to screen out images of at least two of the target surfaces and determine the position of the wheel 400 according to the images of the at least two of the target surfaces.

In some other embodiments, two of the target surfaces are a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

A wheel positioning method is provided based on the above-mentioned wheel positioning system. Specifically, the three-dimensional target 100 is attached to the outer surface of the wheel 400. The image acquisition device 200 acquires images of the target elements 14 of two of the target surfaces in the at least three target surfaces, and the processing system 300 is configured to screen out images of at least two of the target surfaces and determine the position of the wheel 400 according to the images of the at least two of the target surfaces.

In some other embodiments, two of the target surfaces are a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

For example, the processing system 300 recognizes and screens out the images of the target elements 14 of two of the target surfaces from the images fed back by the image acquisition device 200, and then, the position of the wheel 400 may be determined according to the images of the target elements 14 of the target surfaces. Further, before the position of the wheel 400 is determined, two of the target surfaces are a group of calculation units, numerical values calculated according to the different groups of target surfaces are compared and calculated, if wheel position information calculated according to each group of target surfaces is consistent or smaller than a preset error range, factory settings are met, and the position of the wheel 400 may be determined based on the images of the target elements 14 of the target surfaces. Optionally, the position of the wheel 400 is determined according to an average value of the wheel positioning information calculated by the multiple groups of calculation units.

Third Embodiment

Figure 6:
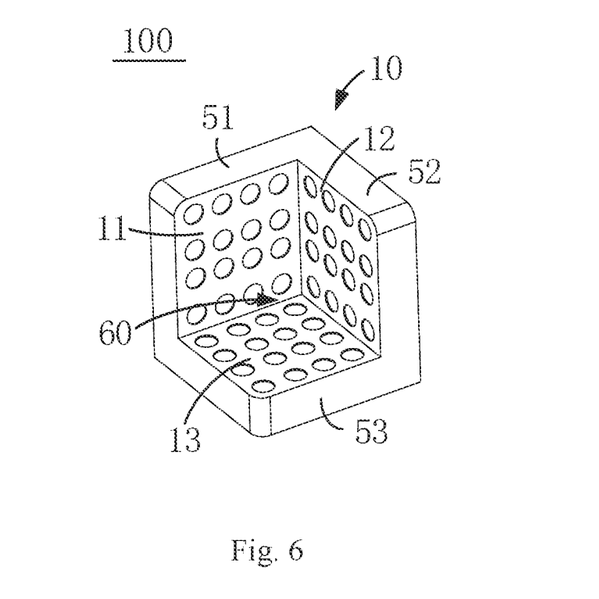
FIG. 6 is a schematic view of a three-dimensional target provided in yet further embodiment of the present application.

As shown in FIG. 6, the three-dimensional target 100 includes a base body 10. The base body 10 is shaped like a stereoscopic block provided with multiple outer surfaces, and optionally, the base body 10 is of a regular geometrical shape. The base body 10 is provided with at least three target surfaces, and the at least three target surfaces are all in different planes, wherein the outer surfaces of the base body 10 are provided with at least three target surfaces, and the at least three target surfaces are all in different planes. The at least three target surfaces are each provided with target elements 14, the spatial positional relationship between the target elements 14 is known, and the geometric properties of the target elements 14 are known, for example, the target surfaces are disposed at a preset angle, and the target surfaces are provided with the target elements 14 configured to be subjected to image acquisition, wherein the target elements 14 are geometric patterns which are concavely or convexly disposed. In the present embodiment, the target elements 14 are round spots concavely disposed in the target surfaces.

In the present embodiment, the target surfaces on the three-dimensional target 100 are protruded outwards, image data may be easily acquired by the image acquisition device 200 from the target elements 14 located on the target surfaces, the at least three target surfaces may respectively face multiple directions, and the at least three target surfaces are all in different planes, so that the three-dimensional target 100 may adapt to multiple outer viewing angles, the image acquisition device 200 may conveniently acquire the image data, and the three-dimensional target 100 is wider in application range. For example, when the three-dimensional target 100 is fixed to a calibrated object, the situation that some of the target surfaces are shielded may occur, but some of the target surfaces may also be protruded so that the image data is easily acquired. By reasonable design, even if individual target surfaces are shielded, the target elements 14 on the remaining visible target surfaces may still be acquired and calculated. The target elements 14 of the multiple target surfaces are acquired and calculated, and thus, the positioning precision is improved.

In addition, two of the target surfaces are used as a group, so that the at least three target surfaces can be configured into multiple groups. Numerical values calculated according to the different groups of target surfaces are compared and calculated, if wheel position information calculated according to each group of target surfaces is consistent or smaller than a preset error range, factory settings are met, and measurement inaccuracy caused by structural variation, such as aging deformation or collision deformation, of the three-dimensional target 100 does not occur. Based on this, if the numerical values calculated according to all the groups of target surfaces are inconsistent or differ greatly, the factory settings are not met, and the three-dimensional target 100 needs to be replaced or returned to a factory so as to be calibrated.

Specifically, in the present embodiment, the base body 10 includes a first wall section 51, a second wall section 52, and a third wall section 53. Every two of the first wall section 51, the second wall section 52 and the third wall section 53 are perpendicular to each other to co-define a conical space 60. The side, facing the conical space 60, of the first wall section 51 is provided with a first target surface 11, the side, facing the conical space 60, of the second wall section 52 is provided with a second target surface 12, and the side, facing the conical space 60, of the second wall section 52 is provided with a third target surface 13. Every two of the first target surface 11, the second target surface 12 and the third target surface 13 are perpendicular to each other.

A wheel positioning system is provided based on the three-dimensional target 100 as shown in FIG. 6 with reference to an application scenario as shown in FIG. 1, and the wheel positioning system includes the three-dimensional target 100, the image acquisition device 200 and the processing system 300.

The three-dimensional target 100 is attached to a wheel 400, the vision range of the image acquisition device 200 faces the three-dimensional target 100, and the image acquisition device 200 is electrically connected to the processing system 300.

The at least three target surfaces face the image acquisition device 200, and the image acquisition device 200 is configured to acquire an image of each of the target surfaces in the at least three target surfaces.

The processing system 300 is configured to screen out images of at least two of the target surfaces and determine the position of the wheel 400 according to the images of the at least two of the target surfaces.

In some other embodiments, two of the target surfaces are a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

A wheel positioning method is provided based on the above-mentioned wheel positioning system. Specifically, the three-dimensional target 100 is attached to the outer surface of the wheel 400. The image acquisition device 200 acquires images of the target elements 14 of two of the target surfaces in the at least three target surfaces, and the processing system 300 is configured to screen out images of at least two of the target surfaces and determine the position of the wheel 400 according to the images of the at least two of the target surfaces.

In some other embodiments, two of the target surfaces are a group of calculation units, and the processing system 300 is further configured to calculate at least two pieces of wheel positioning information according to the images of the target elements 14 of at least two groups of calculation units, compare whether the at least two pieces of wheel positioning information are consistent, and determine the position of the wheel 400 according to the wheel positioning information if the at least two pieces of wheel positioning information are consistent.

For example, the processing system 300 recognizes and screens out the images of the target elements 14 of two of the target surfaces from the images fed back by the image acquisition device 200, and then, the position of the wheel 400 may be determined according to the images of the target elements 14 of the target surfaces. Further, before the position of the wheel 400 is determined, two of the target surfaces are a group of calculation units, numerical values calculated according to the different groups of target surfaces are compared and calculated, if wheel position information calculated according to each group of target surfaces is consistent or smaller than a preset error range, factory settings are met, and the position of the wheel 400 may be determined based on the images of the target elements 14 of the target surfaces. Optionally, the position of the wheel 400 is determined according to an average value of the wheel positioning information calculated by the multiple groups of calculation units.

In summary, in the three-dimensional target 100 in the embodiments of the present application, the base body 10 is provided with at least three target surfaces, the at least three target surfaces are all in different planes, and the target surfaces are provided with the target elements 14 for calibration. Therefore, by using two target surfaces as a group, the at least three target surfaces can be configured into multiple groups, and calibration is performed according to the multiple groups of target surfaces, thus, the accuracy of calibration calculation can be improved. In addition, by comparing calibration parameters obtained by each group of target surfaces, it may be determined whether the three-dimensional target 100 meets a demand on precise calibration, and thus, the invalid three-dimensional target 100 may be replaced in time.

Finally, it should be noted that the above-mentioned embodiments are merely used to describe the technical solutions of the present application, rather than to limit the technical solutions. Based on the concept of the present application, technical features of the above-mentioned embodiments or different embodiments may also be combined according to steps which may be achieved in an arbitrary sequence, there are many other variations in the above-mentioned different aspects of the present application, and for simplicity, they are not provided in detail. Although the present application has been described in detail with reference to the above-mentioned embodiments, it should be understood by the ordinary skill in the art that the technical solutions recorded in all the above-mentioned embodiments may still be modified, or parts of the technical features may be equivalently replaced; and these modifications or replacements do not make the essences of the corresponding technical solutions depart from the scope of the technical solutions of all the embodiments of the present application.

What is claimed is:

1. A three-dimensional target for wheel positioning, comprising a base body, wherein:

the base body is provided with at least three target surfaces, and the at least three target surfaces are all in different planes;

the at least three target surfaces are each provided with target elements, the spatial positional relationship between the target elements is known, and the geometric properties of the target elements are known;

each of the at least three target surfaces is used for wheel positioning;

wherein two of the at least three target surfaces are a group of calculation units, and the spatial position relationship between the target elements of at least two groups of calculation units is used for determining the position of a wheel;

wherein one end surface of the base body is provided with a first target surface, the other end surface of the base body is provided with a second target surface, the base body extends outwards to form a convex part, and the convex part is provided with a third target surface wherein the first target surface and the third target surface are disposed in parallel, and the second target surface is located between the first target surface and the third target surface.

2. The three-dimensional target according to claim 1, wherein the base body is of a stereoscopic blocky structure provided with multiple outer surfaces, wherein the outer surfaces of the base body are provided with the at least three target surfaces.

3. The three-dimensional target according to claim 1, wherein the target surfaces are planes or curved surfaces.

4. The three-dimensional target according to claim 1, wherein the at least three target surfaces are disposed at a preset angle.

5. The three-dimensional target according to claim 1, wherein the target elements are geometric patterns concavely or convexly disposed on the target surfaces.

6. The three-dimensional target according to claim 1, wherein the first target surface and the third target surface face the same horizontal direction, and the first target surface and the second target surface are disposed at a preset angle.

7. The three-dimensional target according to claim 6, wherein a mounting cavity is concavely disposed towards the inside of the base body from the second target surface, and a fixing hole which is through is disposed in the bottom of the mounting cavity.

8. The three-dimensional target according to claim 1, wherein the base body is shaped like a step, the base body comprises a first step, a second step, and a third step, an end surface of the first step is provided with a first target surface, an end surface of the second step is provided with a second target surface, and an end surface of the third step is provided with a third target surface.

9. The three-dimensional target according to claim 1, wherein the base body comprises a first wall body, a second wall body, and a third wall body, every two of the first wall body, the second wall body and the third wall body are perpendicular to each other to co-define a conical space, the side, facing the conical space, of the first wall body is provided with a first target surface, the side, facing the conical space, of the second wall body is provided with a second target surface, and the side, facing the conical space, of the second wall body is provided with a third target surface.

10. A wheel positioning system, comprising a three-dimensional target, an image acquisition device, and a processing system, wherein:

the three-dimensional target is attached to a wheel, the vision range of the image acquisition device faces the three-dimensional target, and the image acquisition device is electrically connected to the processing system;

wherein the three-dimensional target comprises a base body; the base body is provided with at least three target surfaces, and the at least three target surfaces are all in different planes; the at least three target surfaces are each provided with target elements, the spatial positional relationship between the target elements is known, and the geometric properties of the target elements are known; the at least three target surfaces face the image acquisition device;

the image acquisition device is configured to acquire images of the target elements of two of the target surfaces in the at least three target surfaces, wherein two of the target surfaces are a group of calculation units; and the processing system is configured to calculate at least two pieces of wheel positioning information according to the images of the target elements of at least two groups of calculation units, compare whether the at least two pieces of wheel positioning information are consistent, and determine the position of the wheel according to the wheel positioning information if the at least two pieces of wheel positioning information are consistent.

11. The wheel positioning system according to claim 10, wherein:
the image acquisition device is further configured to acquire an image of each of the target surfaces in the at least three target surfaces; and
the processing system is further configured to screen images of at least two of the target surfaces and determine the position of the wheel according to the images of the at least two of the target surfaces.

12. The wheel positioning system according to claim 10, wherein one end surface of the base body is provided with a first target surface, the other end surface of the base body is provided with a second target surface, the base body extends outwards to form a convex part, and the convex part is provided with a third target surface, wherein the first target surface and the third target surface are disposed in parallel, and the second target surface is located between the first target surface and the third target surface.

13. The wheel positioning system according to claim 10, wherein the base body is shaped like a step, the base body comprises a first step, a second step, and a third step, an end surface of the first step is provided with a first target surface, an end surface of the second step is provided with a second target surface, and an end surface of the third step is provided with a third target surface.

14. The wheel positioning system according to claim 10, wherein the base body comprises a first wall body, a second wall body, and a third wall body, every two of the first wall body, the second wall body and the third wall body are perpendicular to each other to co-define a conical space, the side, facing the conical space, of the first wall body is provided with a first target surface, the side, facing the conical space, of the second wall body is provided with a second target surface, and the side, facing the conical space, of the second wall body is provided with a third target surface.

15. A wheel positioning method, wherein the method comprises:
attaching a three-dimensional target to the outer surface of a wheel, wherein the three-dimensional target comprises a base body; the base body is provided with at least three target surfaces, and the at least three target surfaces are all in different planes; and the at least three target surfaces are each provided with target elements, the spatial positional relationship between the target elements is known, and the geometric properties of the target elements are known;
acquiring images of the target elements of two of the target surfaces in the at least three target surfaces, wherein two of the target surfaces are a group of calculation units; and
calculating at least two pieces of wheel positioning information according to the images of the target elements of at least two groups of calculation units;
comparing whether the at least two pieces of wheel positioning information are consistent; and
determining the position of the wheel according to the wheel positioning information if the at least two pieces of wheel positioning information are consistent.

16. The wheel positioning method according to claim 15, wherein the method further comprises:
acquiring images of the target elements of two of the target surfaces in the at least three target surfaces; and
screening images of at least two of the target surfaces, and determining the position of the wheel according to the images of the at least two of the target surfaces.

17. The wheel positioning method according to claim 15, wherein one end surface of the base body is provided with a first target surface, the other end surface of the base body is provided with a second target surface, the base body extends outwards to form a convex part, and the convex part is provided with a third target surface, wherein the first target surface and the third target surface are disposed in parallel, and the second target surface is located between the first target surface and the third target surface.

18. The wheel positioning method according to claim 15, wherein the base body is shaped like a step, the base body comprises a first step, a second step, and a third step, an end surface of the first step is provided with a first target surface, an end surface of the second step is provided with a second target surface, and an end surface of the third step is provided with a third target surface.

19. The wheel positioning method according to claim 15, wherein the base body comprises a first wall body, a second wall body, and a third wall body, every two of the first wall body, the second wall body and the third wall body are perpendicular to each other to co-define a conical space, the side, facing the conical space, of the first wall body is provided with a first target surface, the side, facing the conical space, of the second wall body is provided with a second target surface, and the side, facing the conical space, of the second wall body is provided with a third target surface.

* * * * *